Feb. 23, 1937.   W. C. HEDGCOCK   2,071,628
WHEEL AND AXLE ASSEMBLY
Filed Aug. 1, 1931   3 Sheets-Sheet 1
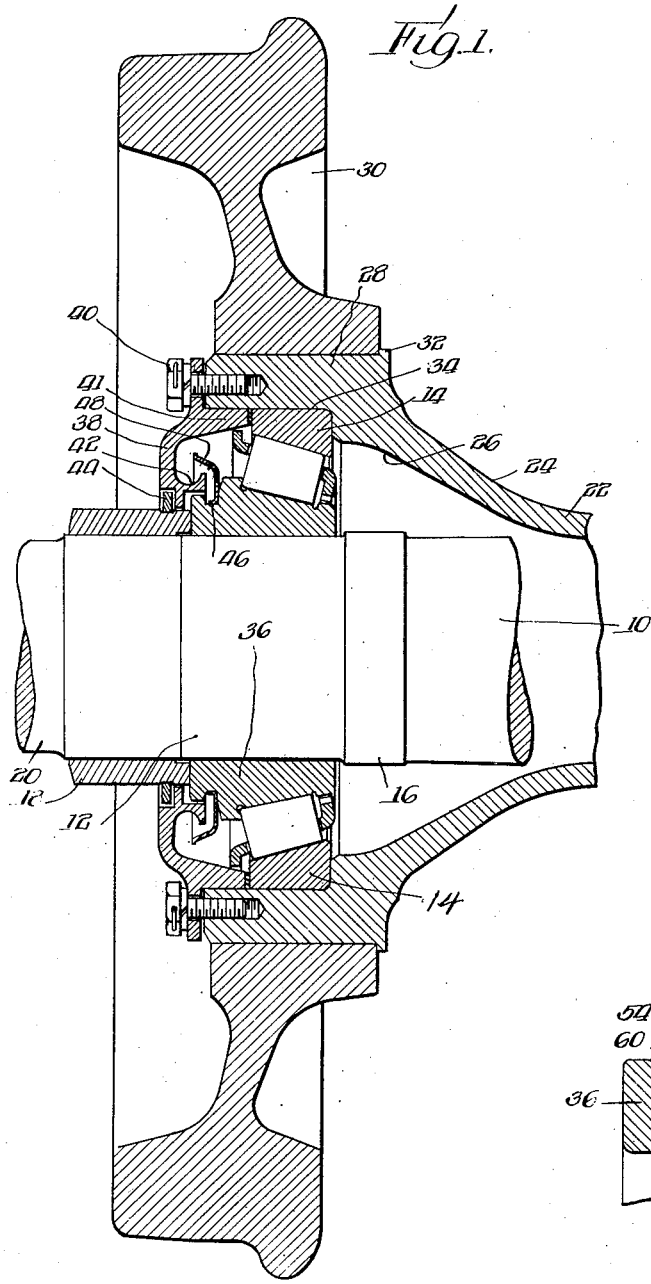
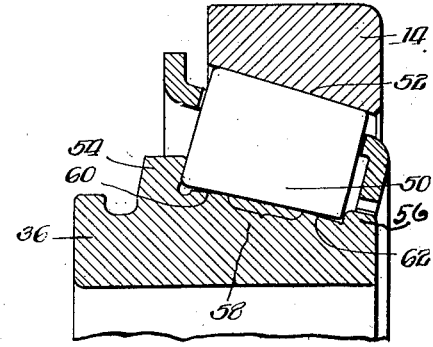
Inventor:
William C. Hedgcock,
By Wilkinson, Huxley, Byron & Knight
Attys

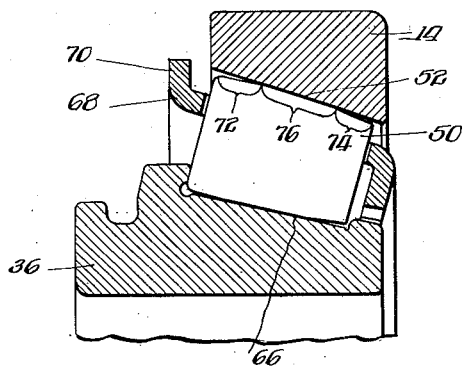
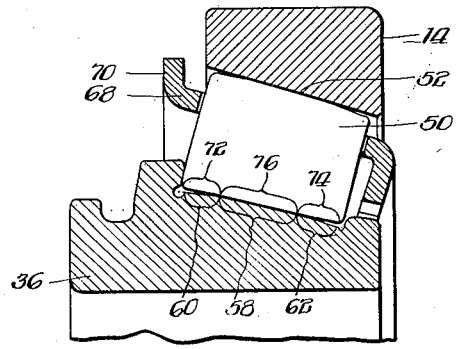
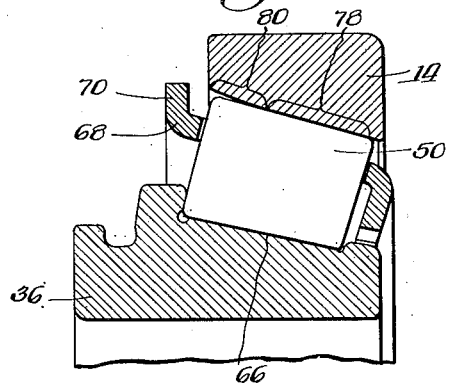
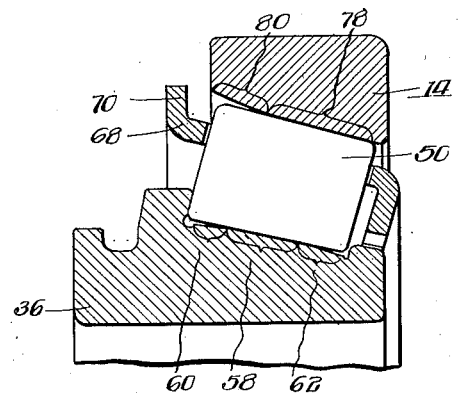
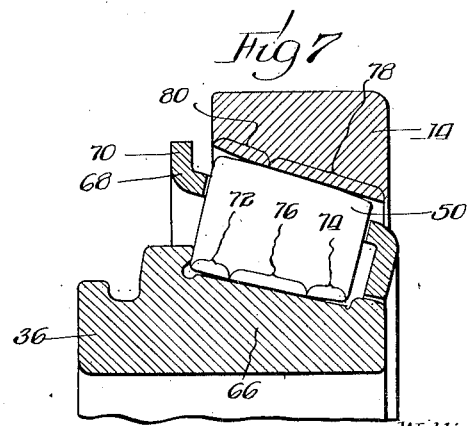

Feb. 23, 1937. W. C. HEDGCOCK 2,071,628
WHEEL AND AXLE ASSEMBLY
Filed Aug. 1, 1931 3 Sheets-Sheet 3
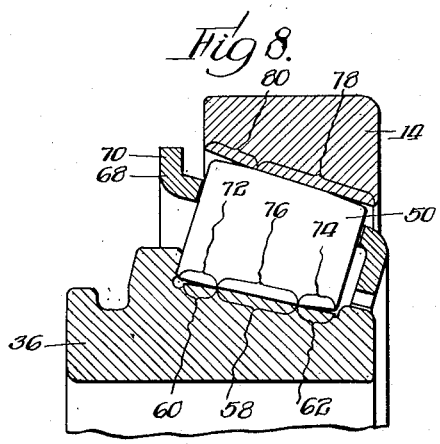
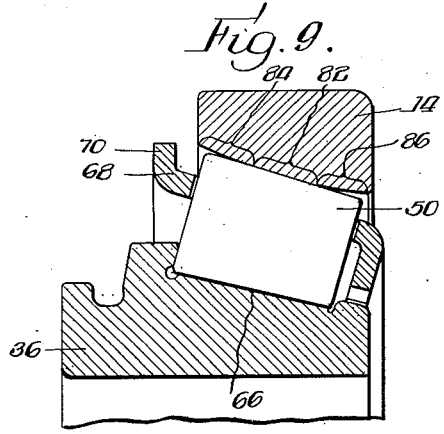
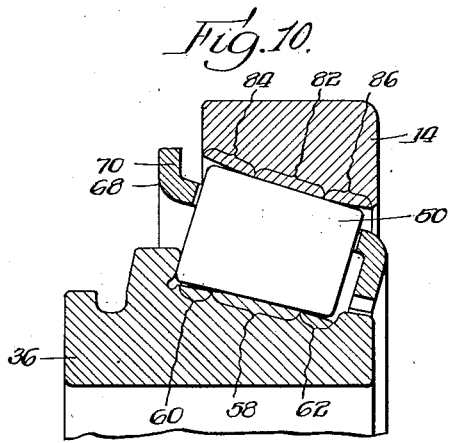
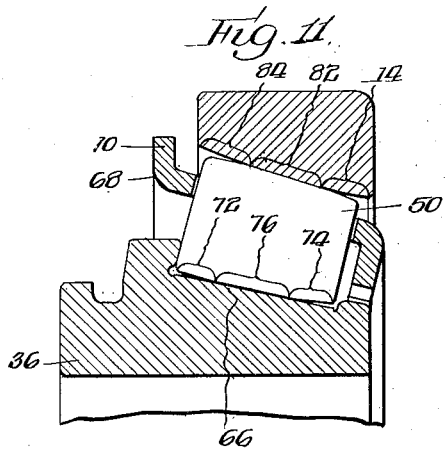
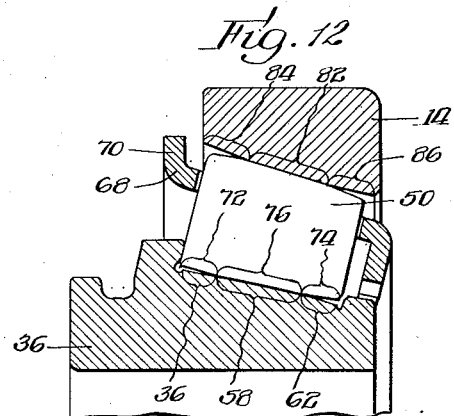
Inventor:
William C. Hedgcock,
By Wilkinson, Huxley, Byron & Knight
Attys.

Patented Feb. 23, 1937

2,071,628

UNITED STATES PATENT OFFICE 2,071,628

WHEEL AND AXLE ASSEMBLY

William C. Hedgcock, Wilmette, Ill., assignor to American Steel Foundries, Chicago, Ill., a corporation of New Jersey Application August 1, 1931, Serial No. 554,492

31 Claims. (Cl. 308—214)

This invention pertains to anti-friction bearings, and more particularly to the application of anti-friction bearings to railway wheel and axle assemblies.

In many roller bearings it is usual to provide tapered frusto-conical rollers having bearing cooperation with inner and outer racerings, the rollers being spaced and retained in relative position by means of a cage. In this usual type of bearing the sides of the rollers are straight, and the inner and outer races are also straight so that contact is obtained between the rollers and races throughout the length of the rollers or their corresponding paths on the races. Where this full length contact is obtained, if there should be any misalignment of the bearing or eccentricity of the loading imparted by the races on the rollers, or the rollers on the races, there may result an undue concentration of load upon some point upon the rollers, depending on the manner of eccentric or misaligned loading.

With the usual design of bearing, such as particularly shown in Figure 3 of the present application, the ends of the rollers, or the edges of the rolling path on the races, terminate in a rather short or abrupt edge, and therefore any concentrated loading on such an edge tends to permit breakdown of the metal structure and shorten the life of the bearing.

It is therefore an object of this invention to provide in a wheel and axle assembly a roller bearing assembly wherein there is gradual diminishing of contact between the roller and race adjacent the end of the roller so that any concentration of pressure will gradually diminish toward the end of the roller or the edge of the raceway, thereby avoiding load concentration toward the extreme end of the roller or edge of the raceway, thus increasing the durability or life of the bearing.

Another object of the invention is to provide a roller bearing assembly wherein cooperating thrust surfaces are provided on the rollers or races, making a proper thrust contact between the races and rollers.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary sectional elevation through a wheel and axle assembly showing the application thereto of one form of anti-friction bearing embodying the invention;

Figure 2 is an enlarged fragmentary sectional elevation through the bearing illustrated in Figure 1;

Figures 3 to 12 inclusive are enlarged fragmentary sectional elevations through modified forms of anti-friction bearings embodying the invention.

Referring first of all more particularly to Figure 1, the inner normally non-rotatable axle 10 is provided with the bearing receiving portion 12 on which the cone 36 of an anti-friction bearing assembly is mounted, the axle being provided with a shoulder 16 against which or adjacent which the cone is disposed, depending upon the particular application of the bearings. The cone is maintained in operative position by means of the shrink collar 18, and the inner axle is provided throughout the extended bearing portion 20 adapted to have cooperative engagement with the usual brasses and wedges in the standard A. R. A. journal box. It is of course to be understood that the axle 10 may be associated with any form of journal box or in direct cooperation with a portion of the side frame of a truck, and may be wholly fixed, floating or semi-floating, and may or may not have vertical, lateral, or other movement with respect to the adjacent truck frame. It will also be understood that the roller bearings may be used with any assembly or any railroad assemblies, such as an inboard type of truck.

The outer casing or revoluble axle 22 is provided with a flared portion 24 forming a lubricant recess 26, the axle terminating in a wheel hub portion 28 on which the wheel 30 is mounted, the wheel being limited in its inward position on the hub portion by means of the shoulder 32. The lubricant recess terminates in a bearing recess 34 in which the cup 14 is mounted, the recess being closed by means of the cover plate 38 secured in position on the casing by means of the bolts 40, the cover plate being provided with an inwardly extending portion 41 which may serve to position the cup. The cover plate is provided with the lubricant conducting channel 42 and baffle means 44 formed partially with means removably disposed on the shrink ring. The cone 36 forms part of the baffle means and is also provided with a lubricant conducting channel 46 which may or may not accommodate a baffle 48 overlying the channel 42.

The roller bearing members 50 are of the frusto-conical type having straight bearing surfaces, and the roller engaging surface 52 of the cup is also frusto-conical having straight bearing engaging surfaces engaging the rollers substantially throughout their length. The cone is provided with the thrust shoulder 54 shown as engaging the large end of the roller and another shoulder 56 may be provided adjacent the small end of the roller.

The cone or inner racering 36 is provided with a frusto-conical bearing engaging surface 58 throughout a portion of the bearing engaging surface length, the edges of said surface being relieved as at 60 and 62, giving a convexed effect. The portions 60 or 62 may be used separately or together, depending on whether load concentration is to be avoided at one edge or the other, or at both edges.

Referring to Figure 3 which shows the conventional form, it will be seen that the inner race 64 is provided with the frusto-conical bearing surface 66 having engagement with the surface of the frusto-conical rollers 50 substantially throughout the length thereof, and an outer race 14 is provided having a frusto-conical bearing surface 52, as has already been described in the form shown in Figure 2.

In the following modifications shown in Figures 4 to 13 inclusive, the inner racerings will each be referred to by numeral 36, the outer racerings by numeral 14, and the rollers by numeral 50. In these modifications, as well as in the modifications shown in Figures 1 to 3 inclusive, the rollers are spaced and guided by means of the cage 68, the cage being provided with an outwardly extending flange 70. The assemblies are in other respects similar and designated with similar numerals as have already been used, the differences in the assemblies residing in the bearing engaging surfaces between the races and rollers, which surfaces will be more particularly described.

In the modification shown in Figure 4, the inner and outer racerings are provided with the frusto-conical bearing surfaces 66 and 52, the relief being accomplished toward the ends of the rollers as at 72 and 74, the intermediate portion 76 being frusto-conical, and it will of course be understood that the rollers may be relieved convexedly as at 72 and 74 at both ends as shown, or at either end.

In the modification shown in Figure 5, the inner race 36 is convexed at both or either ends 60 and 62 having a frusto-conical portion 58, and the roller is relieved at either or both ends as at 72 and 74, being provided with an intermediate frusto-conical portion 76, the outer race in this case being provided with the frusto-conical surface 52.

In the construction shown in Figure 6, the bearing surface 66 of the inner racering is frusto-conical, and the bearing surface of the roller bearing 50 is frusto-conical, the inner portion 78 of the cup is frusto-conical, and the outer portion 80 is convexedly relieved.

In the construction shown in Figure 7, the outer racering 14 is provided with the frusto-conical portion 78 and the convexedly relieved portion 80, the roller bearing being provided with a frusto-conical surface, the inner racering being provided with the frusto-conical portion 58 and the end convexedly relieved portion 60 and/or 62.

In the construction shown in Figure 8, the cup is provided with the frusto-conical bearing portion 78 convexedly relieved as at 80. The cone is provided with the frusto-conical bearing portion 66, and the roller bearings are provided with the frusto-conical bearing surface 76 and the end convexedly relieved at the bearing surfaces 72 or 74, either singly or in combination.

In the construction shown in Figure 9, the outer racering is formed with the frusto-conical section 78 and the end convexedly relieved portion 80. The inner racering is provided with the frusto-conical portion 58 and the end convexedly relieved portions 60 and 62 singly or in combination, and the roller bearing is provided with the frusto-conical bearing surface 76 and the end convexedly relieved portion 72 and 74, either singly or in combination.

In the construction shown in Figure 10, the cup is provided with the frusto-conical bearing surface 82 and the end convexedly relieved portions 84 and 86. The inner racering 36 is provided with the frusto-conical bearing portion 66 cooperating with the frusto-conical bearing surface of the roller 50.

In the construction shown in Figures 11 to 13 inclusive, the cup is provided with the frusto-conical bearing surface 82 convexedly relieved at 84 and 86. The roller 50 in the construction shown in Figure 11 is of the frusto-conical shape and the bearing surface of the inner racering is frusto-conical at 58 and is convexedly relieved at 60 and 62.

With the construction shown in Figure 12, the bearing cooperating surface 66 of the inner racering is frusto-conical and the roller is formed with the frusto-conical bearing surface 76 convexedly relieved at 72 and 74.

In the construction shown in Figure 13, the bearing surface of the roller 50 is frusto-conical at 76 and convexedly relieved at 72 and 74, and the bearing cooperating surface of the cone is frusto-conical at 58 and is convexedly relieved at 60 and 62.

With the constructions shown rollers are provided which relieve stress concentration due to loading or deflection of the inner axle, or any other causes of loading or service. Although bearings have been described herein with thrust shoulders provided on the inner racering, it will of course be understood that the thrust shoulder may be provided on the cup, and rollers may be provided with thrust surfaces such as shown and described in Patents Nos. 2,023,091 and 2,023,092, dated December 3rd, 1935. Also, although a combination of frusto-conical and convex surfaces has been described on races and rollers, it will be appreciated that only convexed surfaces may be used, either of the same or different convexities, or of other forms diverging from the frusto-conical surfaces.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

What is claimed is—

1. An anti-friction bearing comprising inner and outer racerings, rollers mounted therebetween, said rollers being frusto-conical, the outer racering having a cooperating frusto-conical bearing surface, the inner racering having a portion of the bearing surface frusto-conical cooperating with the frusto-conical surfaces of said rollers and another portion gradually diverging to relieve load concentration from said frusto-conical surface at a constantly increasing angle.

2. An anti-friction bearing comprising inner and outer racerings, rollers mounted therebetween, said rollers being frusto-conical, the outer racering having a cooperating frusto-conical bearing surface, the inner racering having a portion of the bearing surface frusto-conical cooperating with the frusto-conical surfaces of said rollers and another portion gradually diverging to relieve load concentration from said roller at a constantly increasing angle.

3. An anti-friction bearing comprising inner and outer racerings, rollers mounted therebetween, said rollers being frusto-conical, the outer racering having a cooperating frusto-conical bearing surface, the inner racering having a portion of the bearing surface frusto-conical cooperating with the frusto-conical surfaces of said rollers and an end portion gradually diverging to relieve load concentration from said frusto-conical surface at a constantly increasing angle.

4. A roller bearing comprising inner and outer racerings, rollers disposed between said racerings, said rollers being frusto-conical, the outer of said racerings having a frusto-conical bearing engaging surface cooperating therewith, the inner of said racerings having a frusto-conical bearing engaging portion cooperating with the frusto-conical surfaces of said rollers and spaced bearing engaging portions gradually diverging at a constantly increasing angle from said frusto-conical portions to relieve load concentration.

5. A roller bearing comprising inner and outer racerings, rollers disposed between said racerings, said rollers and said racerings having bearing cooperating surfaces, certain of said surfaces being frusto-conical for a portion of the length thereof and gradually diverging at a constantly increasing angle therefrom for another portion of the length thereof to relieve load concentration, the frusto-conical surfaces of said rollers cooperating with a frusto-conical surface on each of said racerings.

6. A roller bearing comprising inner and outer racerings, rollers disposed between said racerings, said rollers having a portion of the bearing length thereof frusto-conical, and another portion gradually diverging at a constantly increasing angle from said frusto-conical portion to relieve load concentration.

7. A roller bearing comprising inner and outer racerings, rollers disposed between said racerings, said rollers being frusto-conical, the inner of said racerings having a frusto-conical bearing engaging surface, the outer of said racerings having a frusto-conical bearing engaging portion and spaced bearing engaging portions gradually diverging at a constantly increasing angle therefrom to relieve load concentration.

8. A roller bearing comprising inner and outer racerings, rollers disposed between said racerings, said rollers being frusto-conical, the inner and outer racerings having frusto-conical surfaces engaging the frusto-conical surfaces of said rollers and each having another portion gradually diverging at a constantly increasing angle from said roller to relieve load concentration.

9. A roller bearing comprising inner and outer racerings, rollers disposed between said racerings, said rollers being frusto-conical, the inner of said racerings having a frusto-conical bearing surface cooperating with the frusto-conical surfaces of said rollers and a plurality of surfaces gradually diverging at a constantly increasing angle therefrom, said outer racering having a frusto-conical bearing portion cooperating with the frusto-conical surfaces of said rollers and a portion gradually diverging at a constantly increasing angle therefrom to relieve load concentration.

10. A roller bearing comprising inner and outer racerings, rollers disposed between said racerings, said rollers being frusto-conical, the inner and outer racerings each having a frusto-conical bearing surface cooperating with the frusto-conical surfaces of said rollers and a plurality of surfaces gradually diverging at a constantly increasing angle therefrom to relieve load concentration.

11. A roller bearing comprising inner and outer racerings, rollers disposed between said racerings, said rollers being frusto-conical, the inner of said racerings having a frusto-conical bearing surface, said outer racering having a frusto-conical bearing portion and a convexed portion to relieve load concentration.

12. A roller bearing comprising inner and outer racerings, rollers disposed between said racerings, said rollers being frusto-conical, the inner of said racerings having a frusto-conical bearing surface, said outer racering having a frusto-conical bearing portion and a plurality of convexed portions to relieve load concentration.

13. A roller bearing comprising inner and outer racerings, rollers disposed between said racerings, said rollers having a frusto-conical portion and a convexed end portion to relieve load concentration, said racerings having frusto-conical bearing portions.

14. A roller bearing comprising inner and outer racerings, rollers disposed between said racerings, said rollers having a frusto-conical portion and an end portion gradually diverging at a constantly increasing angle therefrom, to relieve load concentration, said racerings having frusto-conical bearing portions.

15. A roller bearing comprising inner and outer racerings, rollers disposed between said racerings, said rollers having a frusto-conical portion and convexed end portions, the outer of said racerings having a frusto-conical bearing portion, the inner of said racerings having a frusto-conical portion and convexed portions, said convexed portions relieving load concentration.

16. A roller bearing comprising inner and outer racerings, rollers disposed between said racerings, said rollers having a frusto-conical portion and convexed end portions, the outer of said racerings having a frusto-conical bearing portion, the inner of said racerings having a frusto-conical portion and a convexed portion, said convexed portions relieving load concentration.

17. A roller bearing comprising inner and outer racerings, rollers disposed between said racerings, said rollers having a frusto-conical portion and convexed end portions, the inner of said racerings having a frusto-conical bearing portion, the outer of said racerings having a frusto-conical portion and a convexed portion, said convexed portions relieving load concentration.

18. A roller bearing comprising inner and outer racerings, rollers disposed between said racerings, said rollers having a frusto-conical portion and convexed end portions, the inner of said racerings having a frusto-conical bearing portion, the outer of said racerings having a frusto-conical portion and a plurality of convexed portions, said convexed portions relieving load concentration.

19. A roller bearing comprising inner and outer racerings, rollers disposed between said racerings, said rollers having a frusto-conical portion and convexed end portions, the inner of said racerings having a frusto-conical bearing portion, the outer of said racerings having a frusto-conical portion and convexed portions, said convexed portions relieving load concentration.

20. A roller bearing comprising inner and outer racerings, rollers disposed between said racerings, said rollers having a frusto-conical portion and convexed end portions, the inner of said racerings having a frusto-conical portion and convexed portions, the outer of said racerings having a frusto-conical portion and a convexed portion, said convexed portions relieving load concentration.

21. A roller bearing comprising inner and outer racerings, rollers disposed between said racerings, said rollers having a frusto-conical portion and convexed end portion, the inner of said racerings having a frusto-conical portion and a convexed portion, the outer of said racerings having a frusto-conical portion and a convexed portion, said convexed portions relieving load concentration.

22. A roller bearing comprising inner and outer racerings, rollers disposed between said racerings, said rollers having a frusto-conical portion and convexed end portions, the inner of said racerings having a frusto-conical portion and convexed portions, the outer of said racerings having a frusto-conical portion and convexed portions, said convexed portions relieving load concentration.

23. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent certain of said surfaces.

24. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent one of said first-named surfaces on one of said racerings.

25. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent said first-named surface on said rollers.

26. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent one of said first-named surfaces on said inner racering.

27. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent one of said first-named surfaces on said outer racering.

28. A roller bearing comprising inner and outer racerings having frusto-conical surfaces, rollers disposed between said racerings, said rollers having a frusto-conical surface cooperating with the frusto-conical surfaces of said racerings, and a surface diverging at a constantly increasing angle adjacent said first-named surfaces on said rollers and one of said racerings.

29. A roller bearing comprising inner and outer racerings having frusto-conical surfaces, rollers disposed between said racerings, said rollers having a frusto-conical surface cooperating with the frusto-conical surfaces of said racerings, and surfaces diverging at a constantly increasing angle adjacent said first-named surfaces on said rollers and said inner and outer racerings.

30. A roller bearing comprising inner and outer racerings, rollers disposed therebetween, said rollers and said racerings having bearing cooperating surfaces, said cooperating surfaces comprising a frusto-conical surface on said rollers cooperating with frusto-conical surfaces on said racerings, certain of said frusto-conical surfaces extending for a portion of the length of said rollers and gradually diverging at a constantly increasing angle therefrom for another portion of the length of said rollers at least adjacent one end of said rollers to relieve load concentration during the entire life of said bearing.

31. A roller bearing comprising inner and outer racerings, rollers disposed therebetween, said rollers and said racerings having bearing cooperating surfaces, said cooperating surfaces comprising a frusto-conical surface on said rollers cooperating with frusto-conical surfaces on said racerings, certain of said frusto-conical surfaces extending for a portion of the length of said rollers and gradually diverging at a constantly increasing angle therefrom over other portions of the length of said rollers adjacent both ends of said rollers to relieve load concentration during the entire life of said bearing.

WILLIAM C. HEDGCOCK.

CERTIFICATE OF CORRECTION.

Patent No. 2,071,628.   February 23, 1937.

WILLIAM C. HEDGCOCK.

It is hereby certified that error appears in the printed specification of the above numbered patent requiring correction as follows: Page 2, first column, line 22, beginning with the word "Referring" strike out all to and including the word, numeral and period "Figure 2." in line 30; lines 31 and 32, for "Figures 4 to 13" read Figures 3 to 12; line 36, for "Figures 1 to 3 inclusive" read Figures 1 and 2; line 46, for "Figure 4" read Figure 3; line 55, for "Figure 5" read Figure 4; line 63, for "Figure 6" read Figure 5; line 70, for "Figure 7" read Figure 6; and second column, line 3, for "Figure 8" read Figure 7; line 11, for "Figure 9" read Figure 8; line 21, for "Figure 10" read Figure 9; line 28, for "Figures 11 to 13" read Figures 10 to 12; line 36, for "Figure 12" read Figure 11; line 41, for "Figure 13" read Figure 12; page 3, first column, lines 5 and 6, claim 1, strike out the words "to relieve load concentration from said frusto-conical surface at a constantly increasing angle" and insert instead at a constantly increasing angle from said frusto-conical surface to relieve load concentration; lines 15 and 16, claim 2, strike out "to relieve load concentration from said roller at a constantly increasing angle" and insert instead at a constantly increasing angle from said roller to relieve load concentration; lines 25 and 26, claim 3, strike out "to relieve load concentration from said frusto-conical surface at a constantly increasing angle" and insert instead at a constantly increasing angle from said frusto-conical surface to relieve load concentration; page 4, second column, line 25, claim 28, for "divering" read diverging; and that the said Letters Patent should be read with these corrections therein that the same may conform to the record of the case in the Patent Office.

Signed and sealed this 25th day of May, A. D. 1937.

(Seal)

Henry Van Arsdale
Acting Commissioner of Patents.